No. 790,631. PATENTED MAY 23, 1905.
A. W. HALL.
VEHICLE TOP.
APPLICATION FILED MAY 5, 1904. RENEWED MAR. 6, 1905.

WITNESSES:
C. H. Walker.
E. A. Jordan.

INVENTOR
Alonzo W. Hall
By
Milo B. Stevens & Co.
Attorneys.

No. 790,631. Patented May 23, 1905.

UNITED STATES PATENT OFFICE.

ALONZO W. HALL, OF CLEVELAND, OHIO.

VEHICLE-TOP.

SPECIFICATION forming part of Letters Patent No. 790,631, dated May 23, 1905.

Application filed May 5, 1904. Renewed March 6, 1905. Serial No. 248,553.

*To all whom it may concern:*

Be it known that I, ALONZO W. HALL, a citizen of the United States, residing at Cleveland, in the county of Cuyahoga and State of Ohio, have invented new and useful Improvements in Vehicle-Tops, of which the following is a specification.

This invention relates particularly to tops for automobiles having a detachable tonneau or rear seats, and has for its object to provide a detachable additional top section which is carried by the tonneau and which can be placed or removed therewith and when in use joined to a main front top section.

By forming the top in sections, with the front section carried by the front seat and the rear section carried by the rear seats or tonneau, the latter can be detached and removed without removing the whole top.

The invention is illustrated in the accompanying drawings, in which—

Figure 1:
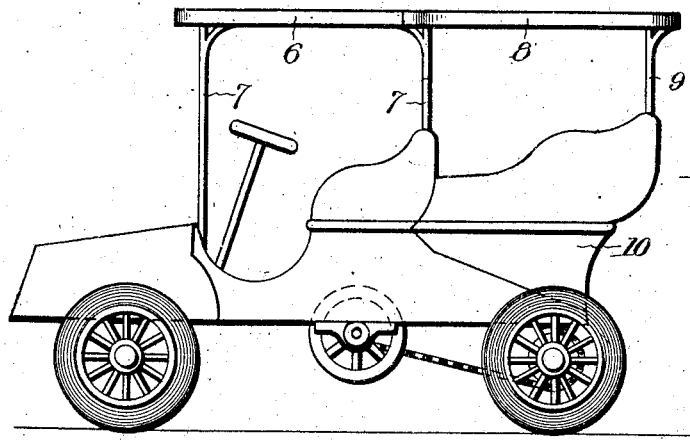
Figure 2:
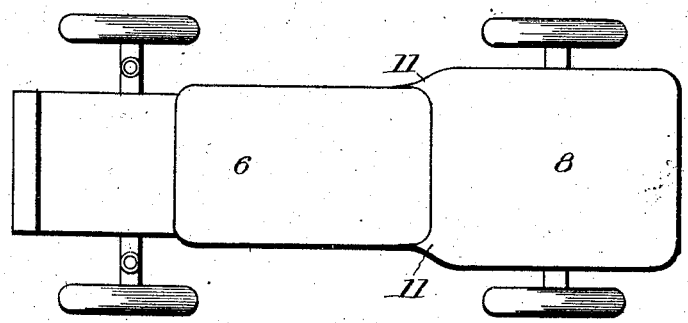
Figure 3:
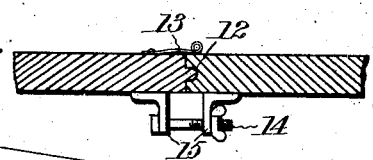
Figure 4:
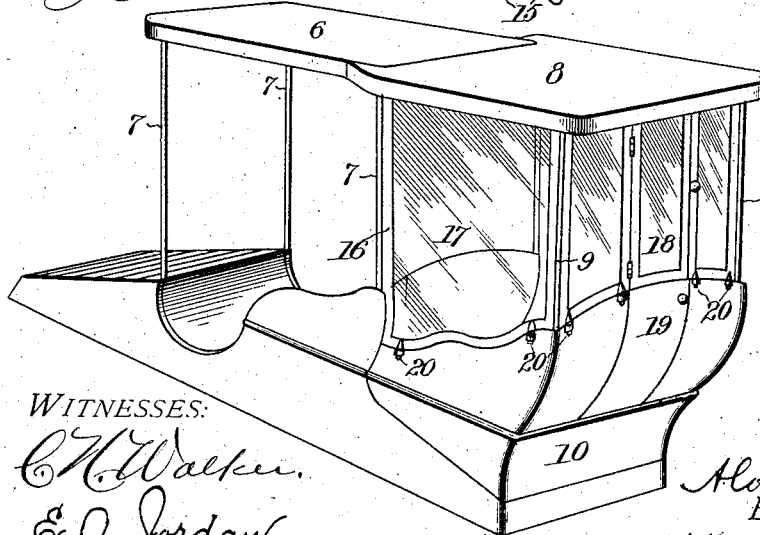
Figure 5:
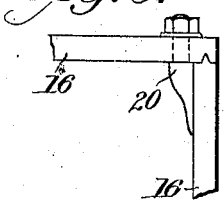

Figure 1 is a side elevation of an automobile provided with my improvement. Fig. 2 is a top plan view. Fig. 3 is a detail in section of the joint between the top sections. Fig. 4 is a perspective view of a modification having glass windows for the rear seats. Fig. 5 is a detail showing a fastening for the window-frames.

Referring specifically to the drawings, 6 indicates the main top section, supported by standards 7 over the front seat. The rear additional top section is indicated at 8, supported by standards 9 above the rear seats. These standards are preferably placed, as shown, extending from the rear corners of the seat-body or tonneau 10, which is detachable from the main vehicle-body in a well-known manner. The rear top section is preferably made somewhat wider than the front top section, both to cover the wider rear seats and also to provide arms 11, which extend a short distance along each side of the main top section and by preventing lateral movement assist in holding the parts together rigidly.

The joint between the front and rear sections may be made water-tight in any approved manner. One construction is indicated in Fig. 3, wherein a tongue-and-groove joint is formed, as at 12, covered by a spring-flap 13 and fastened together on the under side by thumb-nuts and screws 14, extending between brackets 15, fixed to the respective top sections. Any other form of joint may be used as desired, the intent being to provide a water-tight closure.

In the modification shown in Fig. 4 window-frames 16 are made in proper shape to fit between the top edge of the seats and the detachable section 8 and between the standards 9 and the rear pair of standards 7. These frames are glazed, as at 17, and the rear seats are thus inclosed by top and windows, all of which are detachable with the rear seats or tonneau. A glazed door 18 is made in the rear above the usual door 19, leading to the rear seats. It will be seen that the latter top section, including the windows when the latter are used, is detachable with the rear seats or tonneau, leaving the main top section 6 in place above the front seats without in any way impairing the appearance or usefulness of the former. By unscrewing the fastenings 14 the top section will come apart at the joint and the rear section can be applied or removed in a very few minutes. The window-frames 16 are preferably made removable, so that they can be used or not, as desired, a simple fastening, as indicated at 20, being used to hold the window-frames in place.

What I claim as new, and desire to secure by Letters Patent, is—

1. A detachable rear-seat section for vehicles, having a top, and side windows, supported thereby and detachable therewith.

2. The combination with a vehicle having a front seat and a front top section thereover, of a detachable rear-seat section having a rear top section and inclosing sides supported thereon and detachably joined to the front top section.

3. A vehicle-top formed in front and rear separable sections, the rear section having arms at the side which extend along the side edges of the front section.

In testimony whereof I have signed my name to this specification in the presence of two subscribing witnesses.

ALONZO W. HALL.

Witnesses:
JOHN A. BOMMHARDT,
LOTTIE NEWBURN.